420-408 SR
9/14/82 XR 4,349,606

United States Patent [19]

Kishimoto et al.

[11] 4,349,606

[45] Sep. 14, 1982

[54] CONDUCTIVE DEVICE USING CONDUCTIVE POLYMER COMPOSITIONS

[75] Inventors: Yoshio Kishimoto, Hirakata; Wataru Shimotsuma, Ibaraki, both of Japan

[73] Assignee: Matsushita Electric Industrial Company, Limited, Osaka, Japan

[21] Appl. No.: 227,923

[22] Filed: Jan. 23, 1981

[30] Foreign Application Priority Data

Jan. 24, 1980 [JP] Japan .................................... 55-7264

[51] Int. Cl.³ ............................ B32B 7/06; H01C 7/10

[52] U.S. Cl. ................................ 428/411; 252/62.3 Q; 252/500; 338/308; 338/309; 428/327; 428/408; 428/457; 428/463; 428/423.1; 428/425.8; 428/913; 428/212

[58] Field of Search ............... 428/411, 913, 408, 457, 428/463, 425.8, 423.1, 212, 327, 699; 338/225 D, 308, 309, 322, 324; 252/500, 62.3 Q, 62.3 T, 62.3 R

[56] References Cited

U.S. PATENT DOCUMENTS 4,183,006 1/1980 Murakami ........................... 428/419

*Primary Examiner*—Ellis P. Robinson
*Attorney, Agent, or Firm*—Lowe, King, Price & Becker

[57] ABSTRACT

A conductive device using a conductive polymer composition which comprises a mass of a conductive polymer composition in which a conductive charge transfer complex is contained in a polymer matrix and at least a pair of electrodes electrically connected to the mass, at least one component of said complex being contained in or in the vicinity of at least one of the electrodes.

10 Claims, 4 Drawing Figures

CONDUCTIVE DEVICE USING CONDUCTIVE POLYMER COMPOSITIONS

This invention relates to a device using conductive or semiconductive polymer compositions in which conductive charge transfer complexes are contained in polymer matrices.

Many conductive polymer compositions have been proposed including organic polymer compositions in which charge transfer complexes to be an organic semiconductor are dispersed in polymers as well as conductive composite materials in which powders of metals, carbon black or graphite are dispersed in polymers. These compositions are expected to be polymeric semiconductive materials showing excellent moldability, flexibility and the like properties and there are thus provided semiconductive polymers of electron conductivity.

Almost all of the charge transfer complexes are in the form of crystalline powders and are characterized in that when mixed with polar polymer matrices, they are partially dissolved in the matrices and show molecular dispersability. The electron conductivity of these charge transfer complexes results from the donation and acceptance of electron to or from radical ions constituting the complexes and it is believed that the charge transfer is caused in most cases by hopping conduction rather than band conduction.

The partial dissolution of a charge transfer complex in a polymer matrix as mentioned above is disadvantageous when such a composition is employed as an electron conductive material: The radical ions involve not only the donation and acceptance of electons but also an ionic behavior and thus undergoes a polarization phenomenon in a DC electric field, i.e. the electric current varies in the DC electric field as time passes. This polarization phenomenon will be illustrated using a 7,7,8,8-tetracyanoquinodimethane (hereinlater abbreviated as TCNQ) complex whose electron acceptor is TCNQ. TCNQ is readily converted to an anion radical $TCNQ^-$ to form $D^+TCNQ^-$ or $D^+(TCNQ)_2$ complex, so that when applied with a DC electric field, such a compound undergoes a coulomb's force at the anode side. Accordingly, the $TCNQ^-$ anions which are uniformly dispersed in the mass between electrodes move toward the anode more and more with the passage of time on applying the electric field. As a result, the concentration of $TCNQ^-$ anions is lowered in the vicinity of the cathode. This in turn leads to an increase of resistivity in the vicinity of the cathode and thus voltage applied on the portion increases. This results in a more accelerated increase of a resistivity in the vicinity of the cathode, causing a great variation of the resistivity to occur as time passes.

Accordingly, it is an object of the present invention to provide an improved device of conductive polymer composition dispersing charge transfer complexes therein which overcomes the prior art disadvantages.

It is another object of the invention to provide a device of the just-mentioned type which has improved stability over long periods of time.

It is a further object of the invention to provide a device of this type which has a long lifetime and a high reliability.

The above objects can be achieved, in one aspect, by provision of a device using a conductive polymer composition which comprises a mass of a conductive polymer composition in which a conductive charge transfer complex is contained in a polymer matrix, at least a pair of electrodes electrically connected to the mass at a distance from each other, and at least a layer of low resistivity interposed between the mass and one of the paired electrodes in a series connection with the mass, the layer having contained at least one component of the charge transfer complex in an amount larger than the mass.

In another aspect, there is provided according to the invention a device using a conductive polymer composition which comprises a mass of a conductive polymer composition in which a conductive charge transfer complex which is contained in a polymer matrix and at least a pair of electrodes electrically connected to the mass at a distance from each other, at least one of the paired electrodes having contained at least one component of the conductive charge transfer complex.

By the arrangements, the device shows a much improved stability over a long period of time when applied with a DC electric field. Preferably, the complexes are ion-radical salts and are contained at a side of an electrode of the same polarity as that of the ion radicals.

The present invention will be described in detail with reference to the accompanying drawings, in which.

Figure 1:
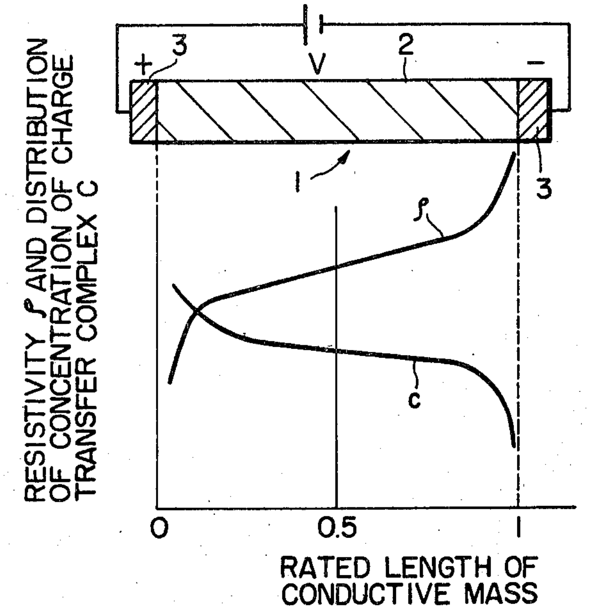
FIG. 1 is a schematic view showing a resistivity and a distribution of TCNQ concentration obtained by application of a DC electric field to a known device using a conductive polymer material in relation to a rated length of a mass of the conductive polymer material.

Referring now to FIG. 1, there is schematically shown a known device 1 which includes a mass 2 of a conductive polymer composition and a pair of electrodes 3,3 attached at opposite ends of the mass 2. As described hereinbefore, when the conductive polymer composition contains a charge transfer complex such as of TCNQ, the concentration of radical ions such as $TCNQ^-$ is lowered in the vicinity of the cathode as shown by curve C of FIG. 1 and thus the resistivity of such a device increases in the vicinity of the cathode as shown by curve $\rho$.

Figure 2:
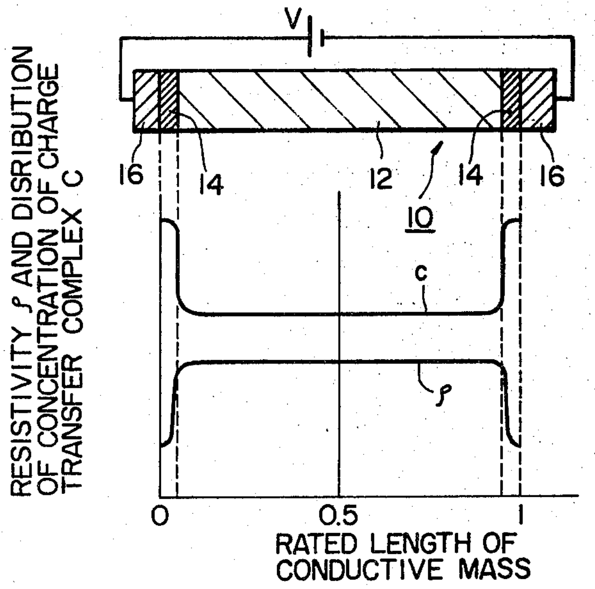
FIG. 2 is a view similar to FIG. 1 and shows a resistivity and a distribution of TCNQ concentration in the mass of the conductive polymer material obtained by application of a DC electric field to a device according to the invention.

On the other hand, FIG. 2 shows a device of the invention, generally indicated at 10, which comprises a mass 12 of a conductive polymer composition containing a charger transfer complex, layers 14,14 of low resistivity which contains at least one component of the charge transfer complex, and a pair of electrodes 16,16 electrically connected to the mass 12 through the respective low resistivity layers. The layers 14,14 should be lower in resististivity than the conductive polymer composition mass by incorporating the charge transfer complex in larger amounts. By the arrangement, the resistivity and distribution characteristics of the complex-containing polymer composition shown in FIG. 1 are so improved as shown in FIG. 2.

In the figure, the low resistivity layers are provided at the both ends of the mass but only one layer may be sufficient to impart similar characteristic properties to the device. In this case, the layer is provided near the electrode of the same polarity as the ion-radicals of the complex. Alternatively, the charge transfer complex may be dispersed in at least one electrode without providing the low resistivity layer to attain similar results, which will be described hereinafter. It will be noted that the mass may be in any form such as a sheet, plate or the like.

The term "conductive polymer composition" used herein means a semiconductive or conductive material whose conductivity varies depending on external factors such as a thermister characteristic, a thermoelectric effect, a photoconductivity, a radiation induced conductivity, a magnetic resistance effect and the like. The conductive polymer compositions are generally comprised of polymer matrices and charge transfer complexes. The polymer matrices may be any of the ordinarily employed polymeric materials including, for example, polyurethane, acryl rubber, ethylene-vinyl acetate copolymer, styrene-butadiene rubber, a mixture of polyurethane and polyvinyl chloride and the like. With polymers showing higher solubility of charge transfer complexes to be contained, there appears a greater influence of the afore-described ion conductivity. On the other hand, non-polar polymers such as polyethylene or polypropylene show little or no solubility, so that a mass using such a non-polar polymer suffers only a relatively small influence of the ion conductivity.

The charge transfer complexes to be used in the present invention are materials which show semiconductivity by themselves and are composed of electron acceptors and electron donors. These complexes act to migrate conductive carriers in the form of ion radicals. The molecules capable of forming anion radicals include, for example, cyanoquinones such as TCNQ, dichlorodicyanoquinone and the like, tetracyanoquinone, hydroquinone and iodine. The molecules capable of forming cation radicals include, for example, sulfur-containing compounds such as tetrathiofluvalene, tetrathiotetracene and tetraphenyldithiopyranylidene, and nitrogen-containing compounds such as ethylcarbazole and N,N-dimethyl-p-phenylenediamine. Of these, cyanoquinones are preferably used and TCNQ is most preferable in the practice of the invention. These charge transfer complexes are dispersed in molecular state in the polymer until their content reaches a limit of solubility and when their content exceeds such a limit, they are in most cases dispersed in the form of grains. The individual grains act as conductive crystal grains.

Then, the behavior of these complexes will be described in detail using, for example, a composition which comprises a blend of polyurethane and polyvinyl chloride having dispersed therein a sodium salt of TCNQ, Na(TCNQ).

Figure 3:
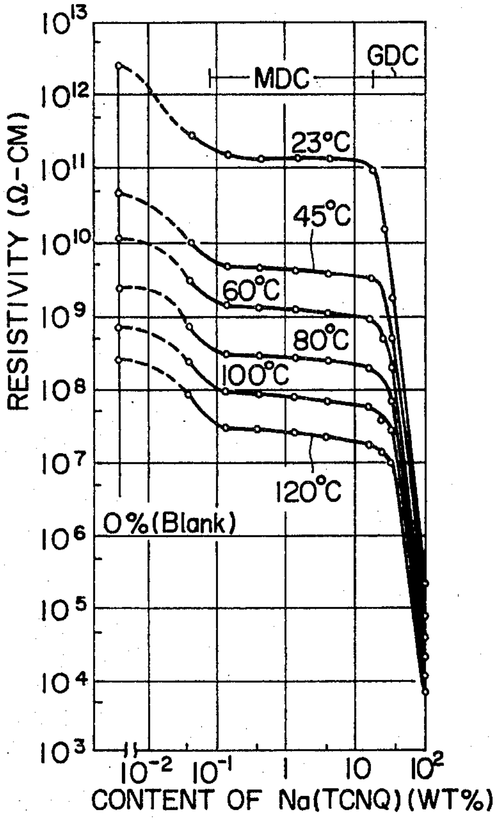
FIG. 3 is a graph showing a relation between a content of TCNQ in a polymer composition and a resistivity for different temperatures.

The relationship between the content of Na(TCNQ) in the mixture and the resistivity $\rho$ for different temperatures is shown in FIG. 3. The solubility of Na(TCNQ) in the polymer matrix is about 0.1%. As compared with the case where Na(TCNQ) is not added (blank), a region where the content of Na(TCNQ) is in the range of 0.05–20 wt% is a conduction region (called MDC) where the conduction is caused by carrier sites dispersed in molecular state and a region where the content is above 20 wt% is a region of electron conduction (called GDC) occurring on contact of dispersed Na(TCNQ) grains with one another.

Figure 4:
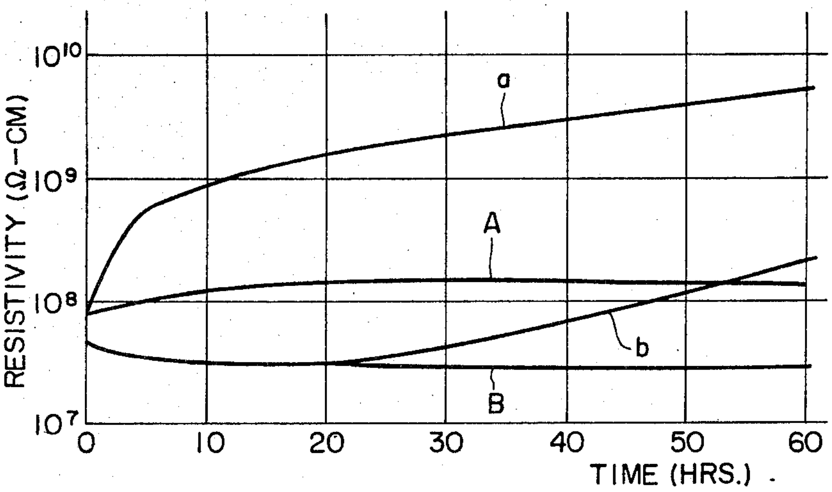
FIG. 4 is a graph showing a resistivity of a device using a polymer composition which is applied with a DC electric field of 50 V at 100° C. in relation to time for different contents of TCNQ and different types of the device.

FIG. 4 shows a variation of resistivity in relation to time in case where a 1 mm thick sheet sample of each polymer composition containing Na(TCNQ) which is provided with a pair of electrodes is applied with a DC voltage of 50 V at 100° C. Curves a and b, respectively, show resistivity characteristics of samples having Na(TCNQ) contents of 0.5 wt% and 20 wt%. The electrodes are arranged such that graphite electrodes are directly connected to the polymer mass.

As is apparent from the figure, in the former region (MDC), a variation of electric current depending on the DC electric field is great as shown by curve a but in the latter region (GDC), the resistivity increases only in a small degree after a certain period of time as shown by curve b. A reason why the current initially increases in curve b is that the grains of Na(TCNQ) are rearranged by the electric field to cause a low resistance. This can be avoided by suitably controlling the hardness of a matrix polymer and a dispersion state of the grains.

Curves A and B show a resistivity characteristic obtained when the carbon electrodes are each provided through a layer of a polymer composition containing 50 wt% of Na(TCNQ) as shown in FIG. 2.

One reason why a variation of curve a is greater than that of curve b in FIG. 4 is that the content of Na(TCNQ) is smaller in the case of curve a than in the case of curve b and thus ion radicals moved by the electric field are not supplemented with the attendant drawback, 50 that the concentration of the complex tends to become uneven in the mass, so that some local portions become high in resistivity.

On the other hand, the device of the invention provided with the low resistivity layers allows radical ions to be supplemented from these layers and no depletion layer of TCNQ is produced, thus the resistance is not being locally raised. Though the concentration of TCNQ in the lower resistivity layer is lowered in the vicinity of the electrode of the same polarity as of the radical ions, the layer becomes so low in resistivity that an increase of the resistivity by the lowering of the concentration is in such a small order as not to give any significant influence on the entire resistance of the device. Therefore, the present invention can provide a device which shows a much improved stability in resistance over a long time.

As mentioned hereinbefore, the matrix polymers in devices of this type used in the present invention may be any ordinarily employed polymers. Polymers showing a smaller solubility of ion radical salts to be added exhibit a more reduced behavior of the ion conductivity. However, when the matrix polymers which show a reduced behavior are employed under conditions of high temperatures and intense electric fields over a long time, this behavior is acclerated, resulting in a variation in resistivity of the device. Accordingly, the present invention is very effective for these devices from the viewpoints of long lifetime and high reliability.

The low resistivity layer used in the present invention is that which is obtained by adding a conductive charge transfer complex of the same type as used in the mass to a polymer matrix in an amount greater than that of the composition for the mass of the device to reduce the resistivity or that which is obtained by dispersing a conductive transfer complex in a polymer showing a higher solubility than the matrix polymer of the composition of the device. Thus the purpose of the invention can be also attained when using a matrix polymer which is different from that used in the conductive polymer composition and has a higher solubility of the complex. That is, higher concentrations of ion radicals in the low resistivity layer make it easier to supplement the ion radicals to the composition mass of the device.

The matrix polymers showing higher solubility of the complex are chiefly nitrogen-containing polymers and electron-donative or electron acceptive polar polymers. Examples of such polymers include polyvinylpyrrolidone, polyvinylpyridine, polyacrylamide, polycation (Ionene), polyurethane, polyamide, nitrile rubber, melamine resins, and the like. Some sulfur-containing polymers may be likewise usable.

The device using the low resistivity layers has been described hereinabove. Then, another type of a device according to the invention in which at least one charge transfer complex is incorporated in at least one electrode will be described. In this case, no low resistivity layer is provided between the mass and the electrodes. The electrode is made of a conductive paint composed primarily of conductive particles and a polymer binder, in which the conductive charge transfer complexes or at least one component of the complexes is added. Similarly to the case where the low resistivity layer or layers are provided, the radical ions are supplemented from the complex-containing electrode by application of an electric field, so that no depletion layer of the radical ions such as of TCNQ is produced, causing the polymer mass not to be rendered high in resistance. In the electrode there takes place a lowering in concentration of the radical ions at or in the vicinity of the electrode of the same polarity as the radical ions but the resistivity of the electrode is so low that an increase of the resistivity caused by the lowering is almost negligible and does not give any significant influence on the device. Conveniently, the conductive paint used in the present invention is an ordinary paint such as a silver paint, a graphite paint or the like. The electrode may by made by applying a metal net with a charge transfer complex-containing conductive paint.

When an electrode made of a carbon paint which contains 50 wt% of Na(TCNQ) was applied to a polymer mass containing such complex and its resistivity was measured by application of a direct current at 100° C. similarly to the case of FIG. 4, similar results as shown in FIG. 4 were obtained.

The at least one component of a complex to be added to the electrode or lower resistivity layer is desirably an ion-radical component of the complex or a neutral compound of the ion radicals. The neutral molecules undergo an electrode reaction on application of an electric field to form ion radicals and the thus formed radicals are able to readily migrate. In this connection, a test was conducted using electrodes of a silver paint incorporated with 10% of neutral TCNQ and a mass of a Na(TCNQ)-containing polyurethane-polyvinyl chloride composition attached with the electrodes as usual, with the result that the resistivity as held almost constant similarly to the curves A and B of FIG. 4.

This is true of cases where 10% TCNQ-containing carbon paint electrodes are applied to a mass of an acryl rubber composition containing 45% of a propylpyridiniumTCNQ complex salt (having a resistivity of $10^6$ Ω-cm at 20° C.), where silver paint electrodes containing 20% of methylquinolium$(TCNQ)_2$ are applied to an ethylene-vinyl acetate copolymer containing 35% of acridinium$(TCNQ)_2$ (having a resistivity of $10^4$ Ω-cm at 20° C., and where silver electrodes are applied through low resistivity layers of 70% $Cs_2(TCNQ)_3$-containing styrene-butadiene rubber to a mass of polyurethane containing 50% $Cs_2(TCNQ)_3$ (having a resistivity of $10^7$ Ω-cm at 20° C.). That is, the devices of the above-mentioned arrangements showed, when invariably applied with a DC electric field, a very small variation of resistance as time passes.

Thus, the invention ensures a long lifetime and a high reliability of the device using conductive polymer compositions containing conductive charge transfer complexes and has a great industrial merit.

What is claimed is:

1. In a device which uses a conductive polymer composition which comprises a mass of a conductive polymer composition in which a conductive charge transfer complex is contained in a polymer matrix, the improved device comprising at least a pair of electrodes electrically connected to said mass at a distance from each other, and at least one layer of low resistivity interposed between said mass and one of the paired electrodes in a series relation with said mass, said layer having contained therein at least one component of said charge transfer complex in an amount larger than said mass.

2. A device according to claim 1, wherein the complex is an ion radical salt and is contained in the low resistivity layer provided in contact with the electrode of the same polarity as the ion radicals.

3. A device according to claim 1 or 2, wherein said ion radical salt contains a cyanoquinone component and is contained in the layer connected to the cathode.

4. A device according to claim 3, wherein the cyanoquinone component is 7,7,8,8-tetracyanoquinodimethane.

5. A device according to claim 1, wherein the low resistance layer is formed of a polymer composition which comprises a polymer showing a solubility of the complex higher than said polymer matrix.

6. A device according to claim 5, wherein said polymer is a nitrogen-containing polymer.

7. In a device which uses a conductive polymer composition in which a conductive charge transfer complex is contained in a polymer matrix, the improved device comprising at least a pair of electrodes electrically connected to said mass at a distance from each other, at least one of the paired electrodes having contained therein at least one component of said conductive charge transfer complex.

8. A device according to claim 7, wherein said complex is an ion radical salt and is contained in an electrode of the same polarity as the ion radicals.

9. A device according to claim 7 or 8, wherein said ion radical salt is a cyanoquinone component and is contained at least in a cathode.

10. A device according to claim 9, wherein the cyanoquinone component is 7,7,8,8-tetracyanoquinodimethane.

* * * * *